(12) United States Patent
Miceli et al.

(10) Patent No.: US 11,090,537 B2
(45) Date of Patent: Aug. 17, 2021

(54) LACROSSE HEAD WITH FIBER REINFORCEMENT

(71) Applicant: Epoch Lacrosse, LLC., St. Paul, MN (US)

(72) Inventors: James Miceli, St. Paul, MN (US); Jason Daniel, Saint Louis Park, MN (US); Paolo Feraboli, Seattle, WA (US)

(73) Assignee: Epoch Lacrosse LLC, St. Paul, MN (US)

( * ) Notice: Subject to any disclaimer, the term of this patent is extended or adjusted under 35 U.S.C. 154(b) by 472 days.

(21) Appl. No.: 15/399,662

(22) Filed: Jan. 5, 2017

(65) Prior Publication Data

US 2018/0185722 A1    Jul. 5, 2018

(51) Int. Cl.
| | |
|---|---|
| *A63B 59/20* | (2015.01) |
| *B29B 11/12* | (2006.01) |
| *B29B 7/90* | (2006.01) |
| *B29C 70/46* | (2006.01) |
| *B29C 70/08* | (2006.01) |
| *B29C 33/30* | (2006.01) |
| *A63B 60/02* | (2015.01) |
| *B29K 105/12* | (2006.01) |
| *B29K 105/08* | (2006.01) |
| *B29L 31/52* | (2006.01) |
| *A63B 102/14* | (2015.01) |

(52) U.S. Cl.
CPC ............. *A63B 59/20* (2015.10); *A63B 60/02* (2015.10); *B29B 7/90* (2013.01); *B29B 11/12* (2013.01); *B29C 33/30* (2013.01); *B29C 70/081* (2013.01); *B29C 70/46* (2013.01); *A63B 2102/14* (2015.10); *A63B 2209/02* (2013.01); *B29K 2105/08* (2013.01); *B29K 2105/12* (2013.01); *B29L 2031/52* (2013.01)

(58) Field of Classification Search
CPC ................................ A63B 59/20; A63B 60/02
USPC ......................................... 473/513, 256, 335
See application file for complete search history.

(56) References Cited

U.S. PATENT DOCUMENTS

| | | | |
|---|---|---|---|
| 6,440,009 B1 * | 8/2002 | Guibaud ................ | A63B 53/04 473/334 |
| 7,238,128 B1 * | 7/2007 | Filice .................... | A63B 59/20 473/513 |

(Continued)

*Primary Examiner* — Eugene L Kim
*Assistant Examiner* — Rayshun K Peng
(74) *Attorney, Agent, or Firm* — Finnegan, Henderson, Farabow, Garrett & Dunner LLP

(57) ABSTRACT

The disclosed embodiments relate to a lacrosse head and a method of manufacture to form the same. A lacrosse head may include a scoop, a throat, and a pair of opposed sidewalls configured to interconnect the scoop to the throat, each sidewall having an interior edge and an exterior edge. The lacrosse head may further include a hub connected to the throat, the hub including a socket configured to receive a stick. Additionally, at least one of the scoop, throat, pair of opposed sidewalls, and hub comprise a matrix material embedded with a plurality of substantially randomly dispersed reinforcing fibers. A method of forming a lacrosse head may include forming a mold assembly having a positive side and a negative side, mixing a composite matrix material by feeding chopped reinforcing fibers randomly into a resinous material, setting the matrix material into the mold assembly, and closing the mold assembly.

13 Claims, 20 Drawing Sheets

(56) References Cited

U.S. PATENT DOCUMENTS

| | | | |
|---|---|---|---|
| 7,491,141 B1 * | 2/2009 | Tucker, Sr. ............ | A63B 59/20 |
| | | | 473/513 |
| 7,833,116 B2 | 11/2010 | Tucker, Sr. et al. | |
| 2008/0026884 A1 | 1/2008 | Morrow et al. | |
| 2011/0070970 A1 * | 3/2011 | Wan .................... | A63B 53/047 |
| | | | 473/335 |
| 2011/0136599 A1 * | 6/2011 | Hayden ................. | A63B 59/20 |
| | | | 473/513 |
| 2014/0103566 A1 * | 4/2014 | Janisse ................. | B29C 70/688 |
| | | | 264/161 |
| 2015/0018136 A1 * | 1/2015 | Goldstein ........... | B29C 67/0059 |
| | | | 473/513 |
| 2016/0310809 A1 * | 10/2016 | Boggs .................... | A63B 60/02 |

\* cited by examiner

LACROSSE HEAD WITH FIBER REINFORCEMENT

TECHNICAL FIELD

The disclosed embodiments generally relate to a lacrosse head, and particularly, to a lacrosse head with distributed fiber reinforcement and a method of manufacture of the same.

BACKGROUND

Generally, designers of sports equipment strive to increase the performance and ornamentation of equipment by reductions in weight and increases in strength, durability, and aerodynamic efficiency. Often, material science and manufacturing costs dictate a compromise between these criteria. For example, sports equipment with complex geometry, such as lacrosse heads, is highly difficult to form by traditional molding processes. Further, traditional molds of sports equipment, such as lacrosse equipment, may be unsuitable for use with modern lightweight materials as prior molds may form equipment with unnecessary sidewall thickness and other structural reinforcing. For example, lacrosse heads currently in the market, have a sidewall thickness in the range of 0.22 inches to 0.60 inches and weigh in the range of about 4.0 to 6.1 ounces (about 115-175 grams). Additionally, traditional methods of manufacture of molded equipment may not be applicable to sports equipment with complex geometries, such as lacrosse heads. Therefore, an advantageous combination of a new type of mold and a method for using the new mold is highly desirable in sports and fitness industries such as lacrosse.

In the early 1970s, plastic molded lacrosse heads appeared on the market. Prior to that time, most lacrosse heads were made of wood. Development of molded plastic lacrosse heads was a significant development in the game of lacrosse because it allowed the use of lacrosse sticks with heads that were much lighter than the immediately prior wooden counterparts. Then, as is the case today, there remains a need for sports equipment that is lighter, stronger, more aerodynamic, and visually appealing. Therefore, it is advantageous to reduce the weight of sports equipment, such as lacrosse heads, as much as practical while adjusting other ornamental and performance aspects such as wall thickness, center of gravity, flexural strength, flex points, resiliency, and durability.

To date, most lacrosse heads are made of molded plastic and are lightweight compared to heads made of wood. Recently, lacrosse heads formed of carbon fiber may have entered the market. However, those lacrosse heads rely on traditional carbon fiber orientations such as parallel fibers, and weave fibers. Furthermore, those lacrosse heads do not have an optimized center of gravity, significant reductions in sidewall thicknesses, flexural zones, flex points, and material properties that counteract shear stress. For example, a significant known problem is that the usage of parallel strand fibers in isolation accelerates crack propagation and shear stress along the sidewalls. The disclosure of the present application addresses many, if not all, of these problems.

The present disclosure addresses one or more of the problems set forth above and/or other problems associated with conventional lacrosse heads.

SUMMARY

The disclosed embodiments relate to a lacrosse head and a method of manufacture to form the same. A lacrosse head may include a scoop, a throat, and a pair of opposed sidewalls configured to interconnect the scoop to the throat, each sidewall having an interior edge and an exterior edge. The lacrosse head may further include a hub connected to the throat, the hub including a socket configured to receive a stick. Additionally, at least one of the scoop, throat, pair of opposed sidewalls, and hub comprise a matrix material embedded with a plurality of substantially randomly dispersed reinforcing fibers.

A method of forming a lacrosse head may include forming a mold assembly having a positive side and a negative side, the negative side having a first cavity surface corresponding to an outer surface of the lacrosse head, and mixing a composite matrix material by feeding chopped reinforcing fibers randomly into a resinous material. The method may also include, setting the matrix material into the negative side of the mold assembly, and closing the mold assembly by applying the positive side to the negative side, thereby defining a closed space corresponding to the lacrosse head. The method may additionally include, applying thermal heat and pressure across the mold assembly, thereby curing the composite matrix material into a hardened shape corresponding to the lacrosse head, and opening the at least one mold to reveal a cured product in the shape of the lacrosse head.

Another method of forming a lacrosse head may include forming a preform carrier mold assembly having a positive side and a negative side, the negative side having a first cavity surface substantially corresponding to an outer surface of the lacrosse head, and mixing a composite matrix material by feeding chopped reinforcing fibers randomly into a resinous material. The method may also include, setting the composite matrix material into the negative side of the preform carrier mold assembly, and closing the preform carrier mold assembly by applying the positive side to the negative side, thereby defining a closed space substantially corresponding to the lacrosse head. The method may additionally include, applying thermal heat and pressure across the preform carrier mold assembly, thereby roughly curing the matrix material into a hardened preform shape corresponding to the lacrosse head, and opening the preform carrier mold to reveal a roughly cured product in the shape of the lacrosse head. The method may further include, forming a mold assembly having a positive side and a negative side, the negative side having a first cavity surface corresponding to an outer surface of the lacrosse head, wherein the mold assembly has surface feature tolerances averaging about 0.13 mm, and transition radii tolerances within about 0.6 mm to 1.2 mm, and setting the roughly cured product into the negative side of the mold assembly. The method may further still include, closing the mold assembly by applying the positive side to the negative side, thereby defining a closed space corresponding to the lacrosse head, and applying thermal heat of about 135 degrees Celsius to 180 degrees Celsius and pressure of about 60 bars to 80 bars across the mold assembly, thereby curing the composite matrix material into a hardened shape corresponding to the lacrosse head.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate exemplary disclosed embodiments and, together with the description, serve to explain the exemplary disclosed embodiments. In the drawings.

DETAILED DESCRIPTION

Figure 1A:
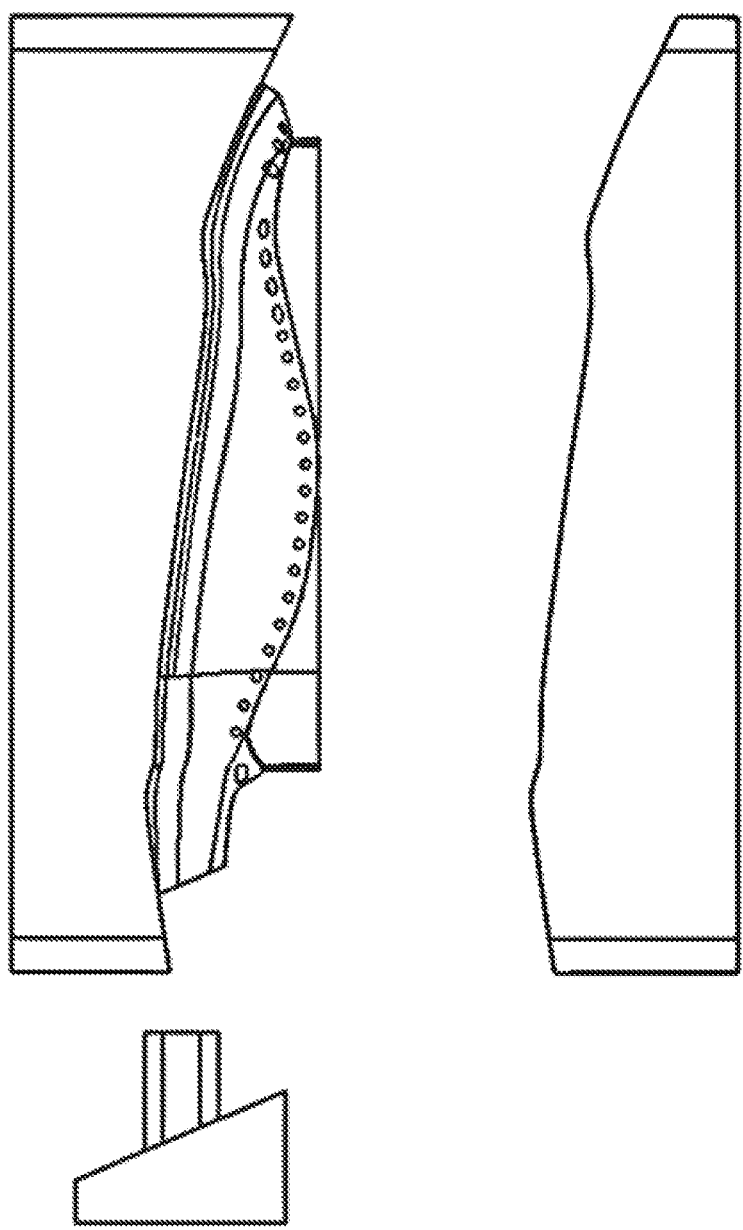
FIGS. 1A-1F show exemplary molds for forming a lacrosse head.
Figure 1B:
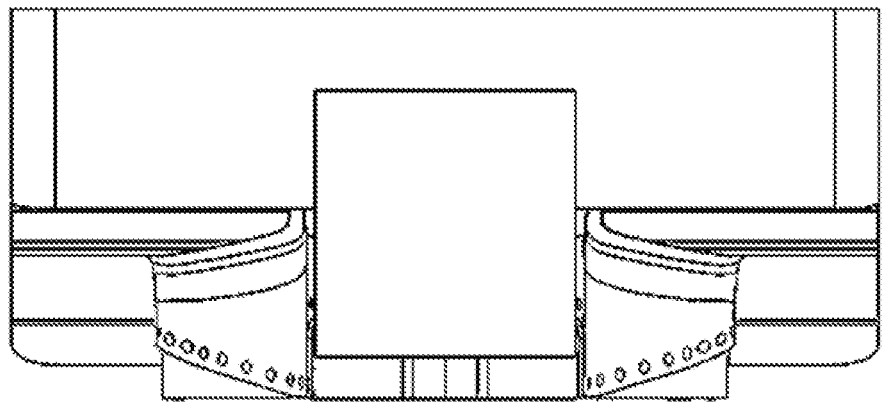
Figure 1B:
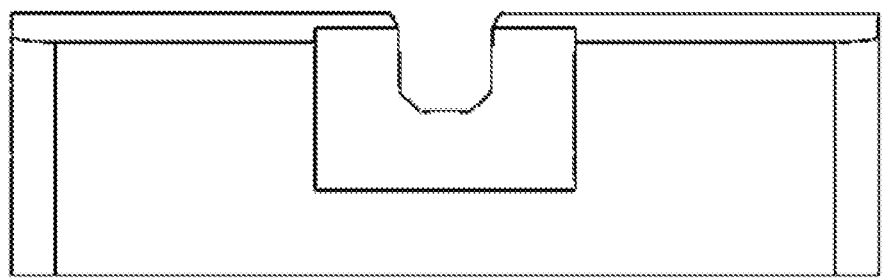
Figure 1C:
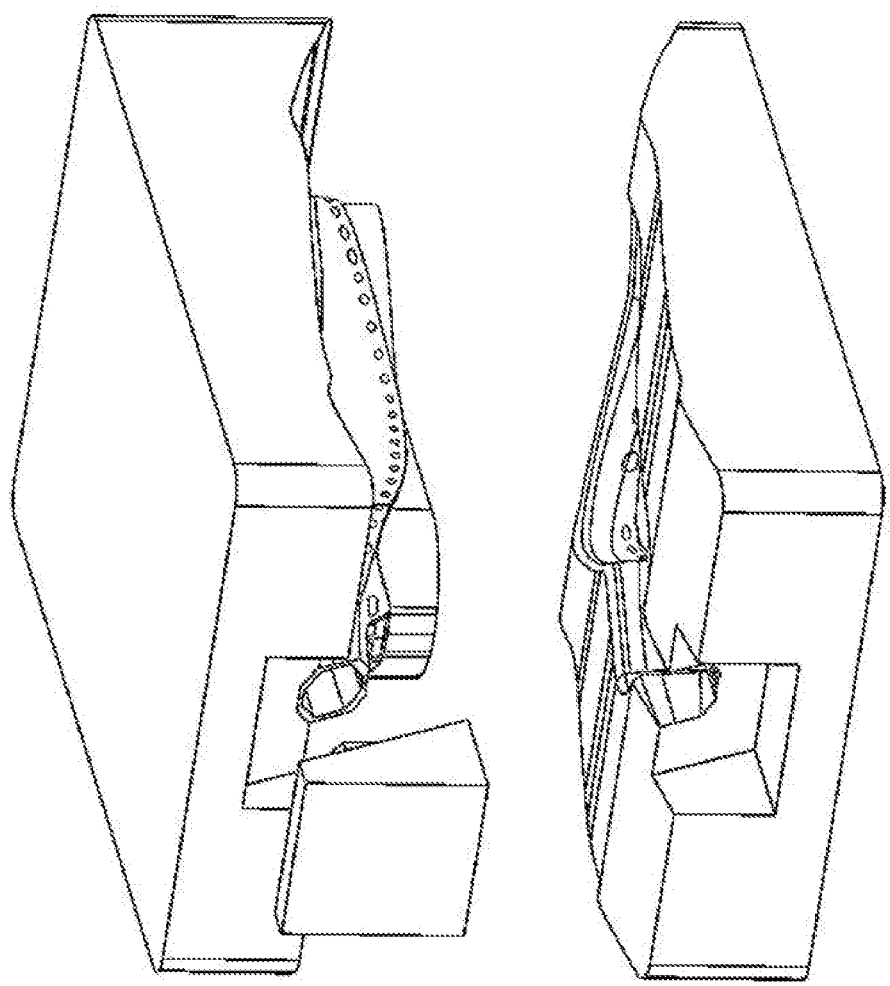
Figure 1D:
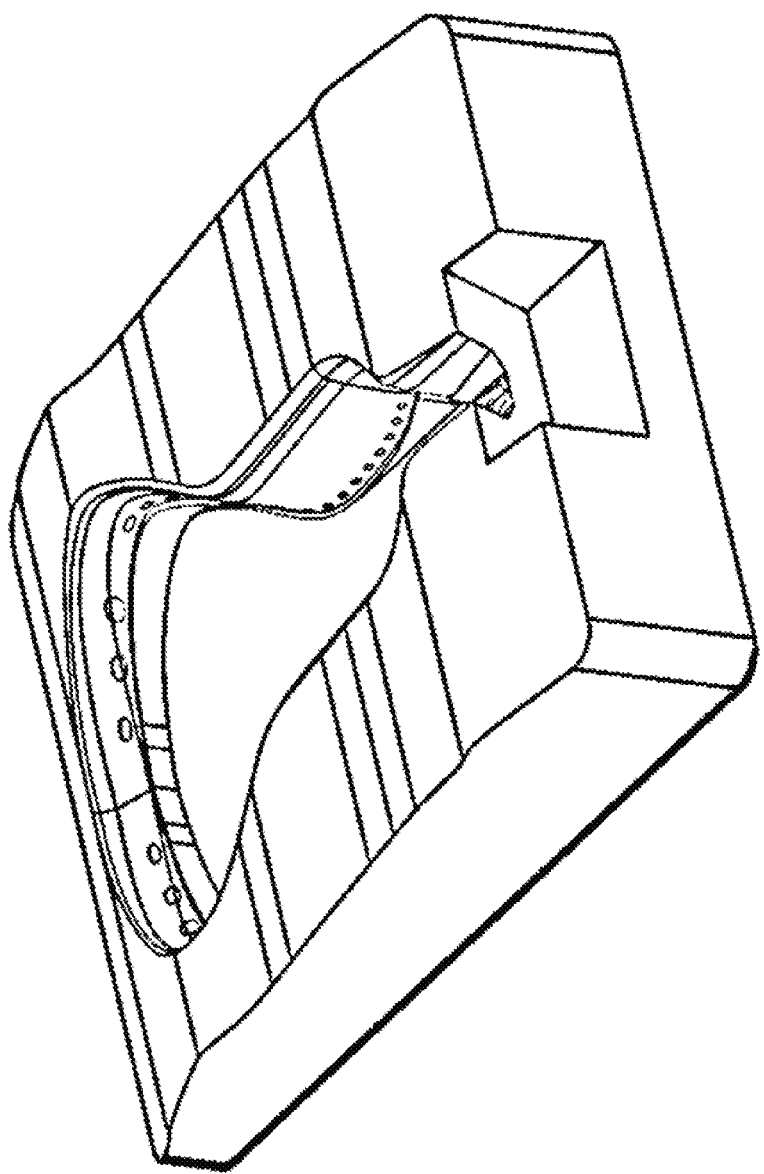
Figure 1E:
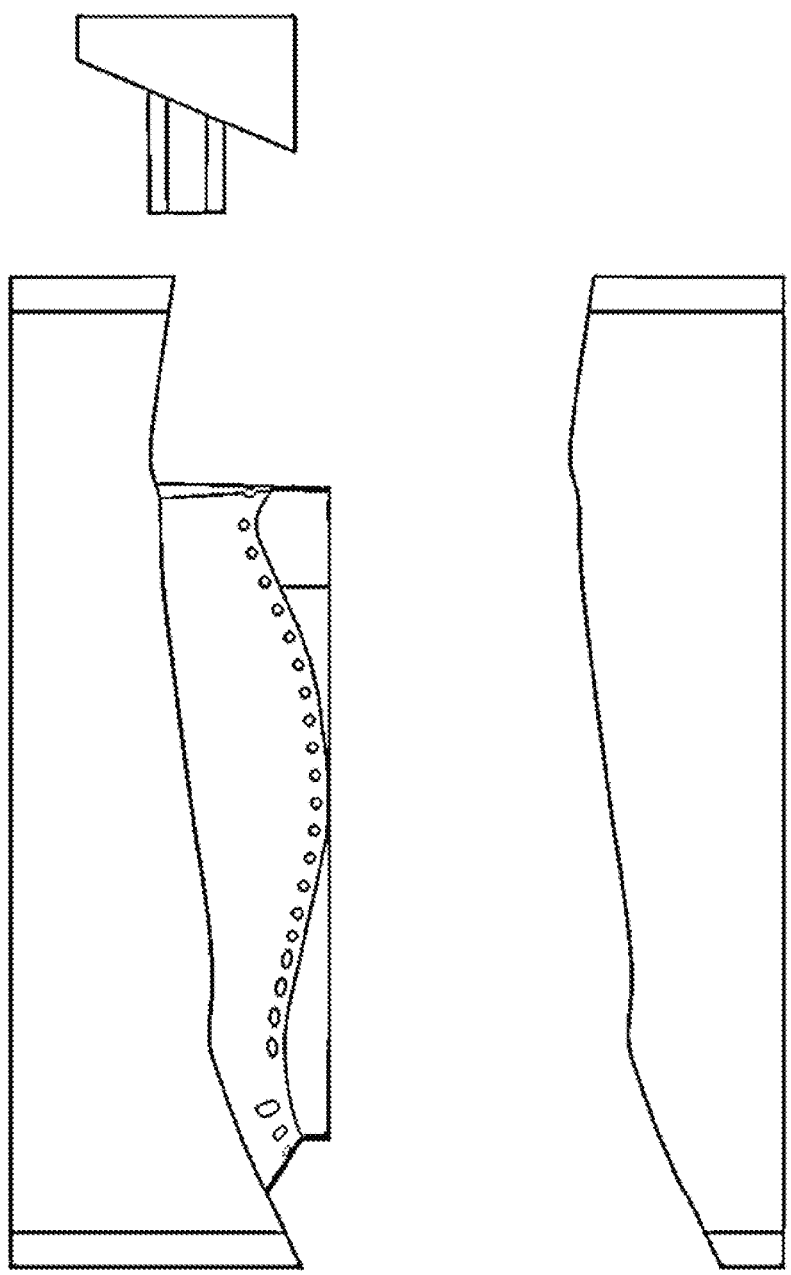
Figure 1F:
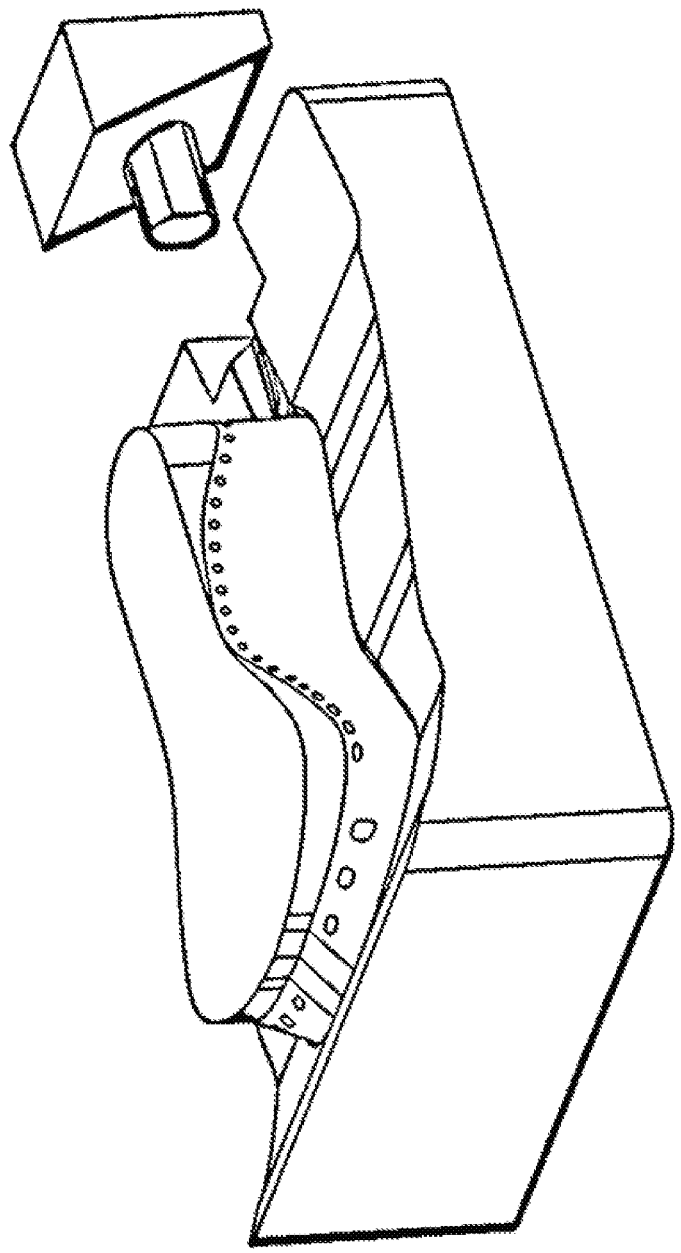

Reference will now be made in detail to the disclosed embodiments, examples of which are illustrated in the accompanying drawings. Wherever convenient, the same reference numbers will be used throughout the drawings to refer to the same or like parts. However, a species of a genus may be referred to by the same reference number of the genus when describing the species in further detail.

FIGS. 1A-1F depict an overview of a mold that may be used to form a lacrosse head. The mold may be a compression mold for use with a sheet molding compound ("SMC") process. Moreover, the mold may be used in combination with an SMC process with the inclusion of a fiber additive, for example, fibers, and a matrix material. Exemplary fibers may include: carbon, glass, aramid, boron, UHMWPE, or aluminum fibers. An exemplary matrix may be formed from: epoxy, polyester, polyurethane, cyanate esters, polyimides, or a thermoplastic material, such as nylon, polyethylene, polypropylene, ABS plastic, PEEK or polycarbonate, or any combination of the same. The mold itself may have highly complex three-dimensional geometries, such as arcing, exceptionally thin sidewall thickness, and ornamentation. In this way, the mold may form a lacrosse head with highly complex geometrical properties out of a resin matrix impregnated with a fiber additive. Further, the mold may be designed to withstand intense compression and heat. Additionally, the mold may operably be designed to deliver a specific compression across the matrix material and at specifically controlled temperatures throughout the curing process.

The temperature and compression variables may be, at least partially, dependent on the type of matrix material, fiber additive, and geometrical properties of the product. For example, a temperature of 135° C.-180° C. at a pressure of 60-80 bar. At least one differentiating aspect of the disclosed molds is that they may withstand pressure on the order of ten times the typical pressure utilized by a conventional autoclave mold.

In at least one embodiment, the high pressure may necessitate a mold with superb structural rigidity and smoothness. For example, a mold may be made from cold-hardened, chromed, and/or polished steel. Importantly, the high pressure is advantageous as it may force the matrix material to evenly distribute into complex orifices and apertures.

In at least one embodiment, the mold has superb heat transfer properties. For example, the mold may be operably designed to evenly transfer heat consistently throughout the mold or additional heat may be applied in areas of the mold that correspond to greater thickness.

In another embodiment, the mold may have an extremely low frictional coefficient, as smoothness may be advantageous when forming complex parts. In other embodiments, the mold may have raised textural elements such as dimples and crosshatching as these textural elements may impart ornamentation and/or gripping elements.

In at least one instance, two molds may be used in coordination with another. For example, a preform carrier mold may receive roughly shaped material. The preform carrier mold may allow the roughly shaped material to be refined and shaped into a closer semblance for use in a complex mold. In this way, rough preformed shapes may undergo an iterative process of any number of multiple molds until the material is suitable for the final complex three dimensional mold of a finished product.

The final complex mold may have sharp edges, tight radii on corners, non-uniform geometry, varying texture, varying thickness, and incorporate logos and trademarks. An iterative process of utilizing multiple molds of varying levels of detail may allow stockpiling of preformed material for later use in a complex mold. Further, any of the molds may have undercuts and ejector pins for rapid ejection of preform carrier molds for use in complex molds.

In at least one embodiment, a mold may have dimensional tolerances on the order of 0.18 mm, surface feature tolerances on the order of 0.13 mm, and transition radii tolerances on the order of 0.6 mm-1.2 mm. If desired, an additional mold of even greater complexity and dimensional tolerances may be used successively after the initial mold. For example, the successive mold may have dimensional, surface feature, and transition radii of even greater tolerances.

Figure 2:
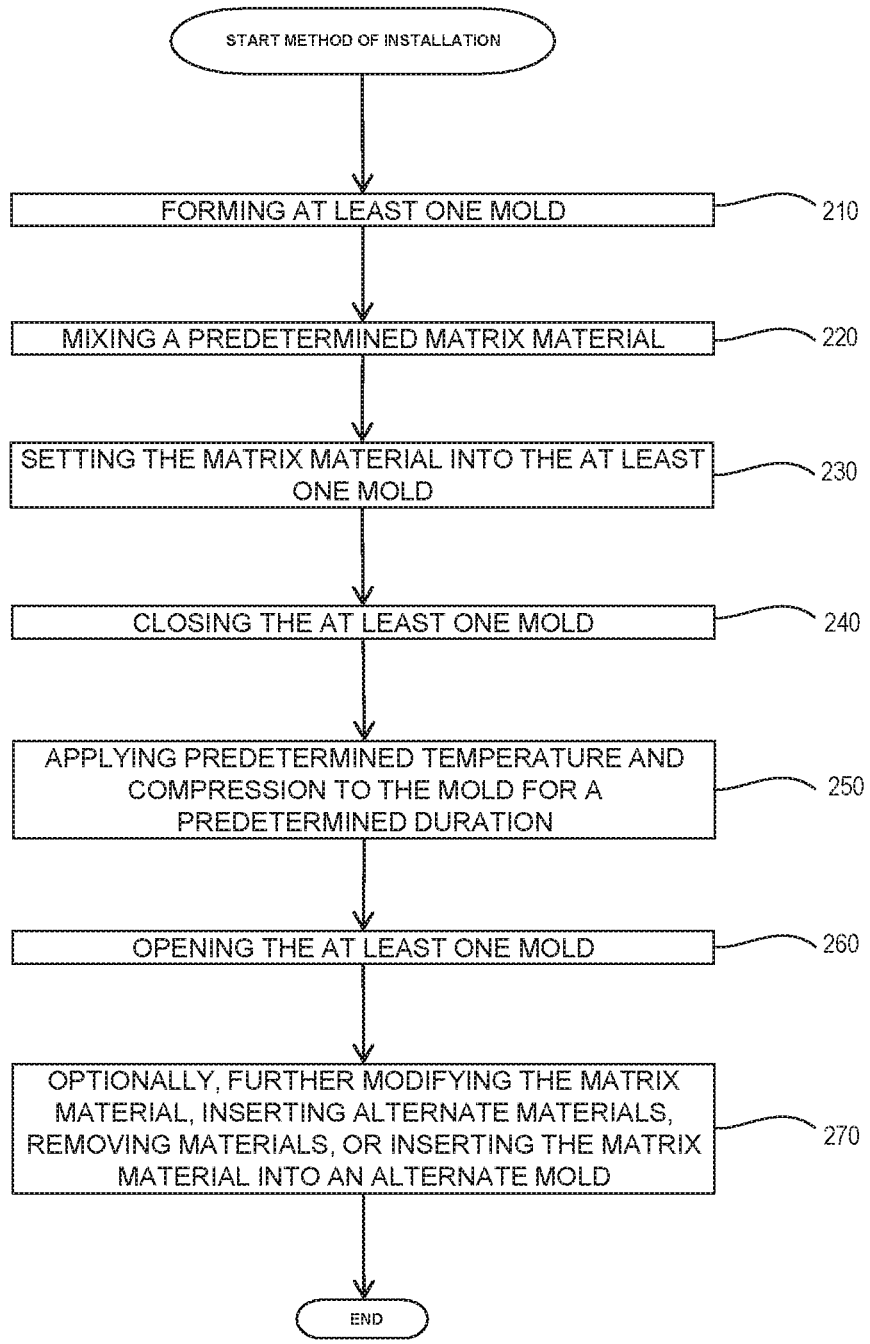
FIG. 2 is an exemplary flow chart of a method for forming a lacrosse product.

FIG. 2 is a flow-chart diagram of a method of manufacture of a lacrosse head. The method of manufacture may rely upon using the mold and/or molds as previously disclosed. First, at step 210, at least one mold may be formed. In other exemplary methods multiple molds may be formed. Next, at step 220, a matrix material may be mixed. The matrix material may be mixed according to numerous material formulations. For example, at least one exemplary mixture of a matrix material may involve short strand fibers, such as carbon fibers, that may be mixed with a resin matrix to form a composite matrix material of randomly distributed fibers by an industrial process such as a sheet molding process ("SMC").

A non-exhaustive list of fibers may include: carbon, glass, aramid, boron, UHMWPE, or aluminum fibers. The fibers may be in the range of 0.1" to 2" in length, and with a diameter of about 5 microns to 10 microns. The fibers may originate in bundles ("tows"), and at least marginally, remain in bundled form throughout the forming process.

When longer fibers are utilized they may ultimately form a stronger part and shorter fibers may ultimately form a more uniform part of greater dimensional complexity. Therefore, the predetermined cutting/chopping location may be dependent on the specific type of mold, part, and/or sub-section at issue.

In at least one embodiment, a bundle of fibers may consist of 3,000 fibers to 12,000 fibers. Alternatively, a bundle may have any number, length, strength, or type of fibers. In examples in which carbon fibers are employed, the carbon fibers may have a tensile strength in the range of 2-7 GPa and a tensile modulus in the range of 200-700 GPa.

An industrial process, such as an SMC process, may involve chopping strands of fibers and/or bundles of fibers, such as carbon fibers, and randomly distributing the chopped fibers into a resin matrix to form a matrix material. For example, multiple tows of carbon fibers in a substantially dowel like shape may run through a conveyor of an industrial machine that chops the tows at predetermined locations and feeds them into a resin matrix.

The chopped fibers may be fed into a resin like material to form a matrix material. Exemplary resin like materials may include; epoxy, polyester, polyurethane, cyanate esters, polyimides, or a thermoplastic material, such as nylon, polyethylene, polypropylene, ABS plastic, PEEK or polycarbonate, or any combination of the same.

At least one type of resin matrix material may be a sheet paste matrix material in which the resin like material is initially formed into thin sheets. In this way, the chopped fibers may be dropped onto a first layer of a sheet paste matrix by an industrial process and become impregnated between multiple layered sheets. Any number of sheets and layering may be used to form the matrix material with the assistance of an SMC system.

The sheets of paste matrix material may be compacted to form a continuous sheet of mixed and randomly distributed fibers throughout the paste matrix material. Any number of sheets may be layered one on top of the other as may be desirable for certain applications and varying end thicknesses. Moreover, the thickness of the layered sheets may correspond to the thickness of the mold and or molds as previously described.

Next, at step 230, the matrix material may be set, inserted, or layered into the mold. For example, sheets of paste matrix material may be cut into preformed shapes resembling a mold, and placed into a first preform carrier mold. The preform carrier mold may assist with shaping the matrix material into a shape that more closely resembles a second complex mold. In other embodiments, the matrix material may be set directly into a complex mold.

The matrix material, which may be sheets of paste matrix, may be applied to the negative surface (female side) of the preform carrier mold to assist with distribution of the matrix material. The matrix material may comprise a paste matrix, preformed shape, bundles of fibers, sheets of paste matrix, and other additives. Next, at step 240, the positive (male side) of the mold may be closed against the matrix material.

Next, at step 250, heat and compression may be simultaneously applied to the matrix material with the assistance of the mold. A predetermined temperature may be automatically applied to the mold. The mold may also impart a predetermined pressure to the matrix material. In this way, varying pre-set and/or pre-determined temperatures and pressures may be applied to the matrix material. Furthermore, they may be applied for varying durations as may be appropriate for the complexity of the end product.

Differing compositions of matrix material may receive differing amounts of compression and differing temperatures, which may, at least partially, depend upon what type of mold is used. For example, the preform carrier mold may have less compression and a lower temperature than the final complex mold.

Moreover, the compression and heat cause the matrix material to become more malleable such that it may be shaped into the finer details of the mold. For example, by heating the matrix material it may become less viscous and flow more easily thereby fully entering all of the fine details and complex geometries of the complex mold.

Next, at step 260, the mold may be opened. In at least one exemplary method, step 260 may be performed after the matrix material has hardened, and or cooled off. In this exemplary embodiment, the method of manufacture may be substantially complete. However, other embodiments may undergo further modifications.

Next, at optional step 270, the mold may be opened for further modification before repeating a similar process as previously outlined. For example, the subsequent process may be repeated in a different mold of even greater detail and complexity than the prior mold. However, in at least one embodiment the matrix material may be substantially formed into a final shape after a single iteration of the process and may only require minor modification by way of sanding, buffing, trimming, and/or painting.

In other exemplary methods of construction, first and second molds may be opened during the heating and cooling process at select times to insert additional materials in an intermediate optional step. For example, a sacrificial material, such as a lead weight, may be placed in the mold at a region that correlates to the scoop of a lacrosse head. The insertion of the sacrificial material in a controlled location may advantageously increase the rotational momentum during an arcing swing of a lacrosse head and stick.

Moreover, sacrificial materials may be used in this way to alter the center of gravity of a lacrosse head in a desirable way. This intermediate step may include, for example, opening the mold, inserting a sacrificial material, closing the mold, reheating the mold, and applying pressure by way of the mold. Similarly, the material can be reheated, at least partially, before opening to alter the viscosity of the matrix material during an insertion stage. Furthermore, the sacrificial material may be beneficial in accelerating the shot speed of an end user playing lacrosse.

In other exemplary methods, additional structural reinforcement may be inserted into the mold at discrete locations to stiffen the end product. For example, fibers, such as parallel strand fibers, may be inserted at discrete locations to alter flex points and/or to increase structural rigidity. Placing parallel strand fibers along the outer edges of the molded material, which may correspond to the outer edge of the end product, may result in an increase in structural rigidity of the end product. Further, it may result in the creation of flex points along the boundary regions.

Other exemplary methods may include incorporating weave fibers. Weave fibers may include twill weaves, unidirectional weaves, plain weaves, and other weave like patterns. A weave may consist of numerous fibers woven into a pattern in a similar manner to fabrics. Differing weave patterns have differing mechanical properties such as tensile and flexural strength. In this way, differing weave patterns may be used to impart flexural properties in specific directions only. For example, the scoop of a lacrosse head may deflect backwards but not forwards. In this way, the scoop may deflect to receive an impact from a ball but will not flex forward when throwing a ball.

An exemplary method incorporating weave fibers may include an intermediate step comprising opening the mold, inserting parallel band fibers or weave fibers, closing the mold, reheating the mold, and applying pressure by way of the mold. In this way, the matrix material (including all materials within the mold) can be reheated to alter the viscosity during an insertion stage. By altering the viscosity, newly introduced materials can form, cure, and become integral with the pre-existing materials.

The insertion of structural elements in a controlled location may advantageously stiffen the outer edges of the lacrosse head. Increased stiffness at the perimeter of a lacrosse head may be beneficial in protecting a lacrosse ball from an opponent and optimizing cradling control as the extremities of the end product may be more rigid and not prone to deformation.

Further still, in other exemplary embodiments, the mold may be opened and material may be removed at discrete locations to alter the center of gravity and create flex points. For example, material may be removed near a location corresponding to the stick end of the mold to accentuate the effect of a sacrificial material at the tip end of a lacrosse head or vice versa. Further, the removal of material may alter the flexural rigidity such that the lacrosse head may more easily bend or flex at a location corresponding to the stick end or vice versa.

At least one exemplary method of construction outlined above may require the controlled placement of at least one material before the closing step. The controlled placement of material is different than an injection molding process. Further, the exemplary methods and molds outlined above may be optimized to temporarily alter solid to solid like materials to a low viscosity state when under heat and pressure. These disclosed methods are distinct from stamping processes in that the material achieves very high flow, sufficient to move into and form very complex geometries. Furthermore, the method of manufacture, when utilized in conjunction with the aforementioned molds, may produce a lacrosse head with a weight in the range of approximately 80 grams to 125 grams, or approximately 2.80 ounces to 4.32 ounces.

Figure 3:
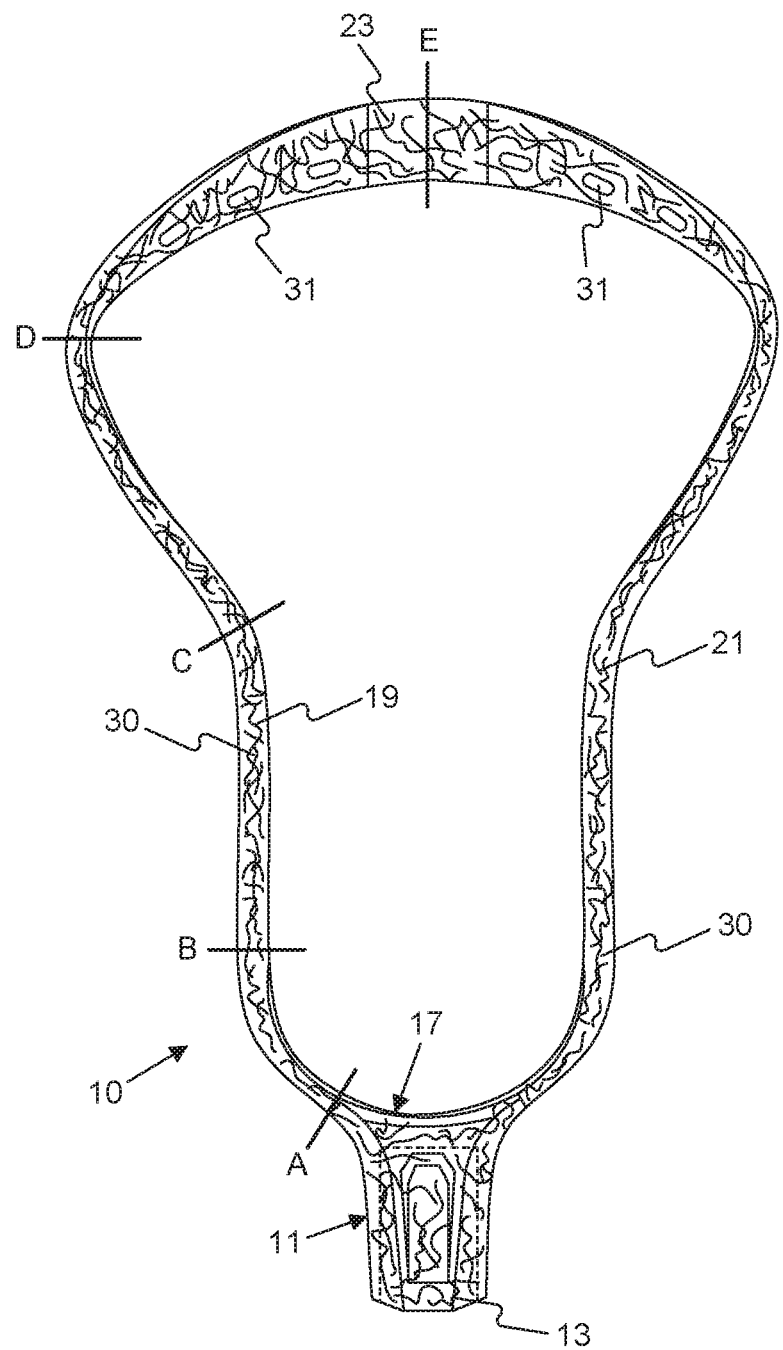
FIG. 3 is a front view of a lacrosse head.

FIG. 3 provides a front view of a lacrosse head 10, in which the proximal end of the lacrosse head may include a hub 11. Hub 11 includes a socket 13 configured to receive a handle or stick. The lacrosse head 10 may receive the handle or stick in a number of ways including, through the use of a set screw, by adhesive, or by being manufactured integrally with the rest of the lacrosse head 10.

Figure 4:
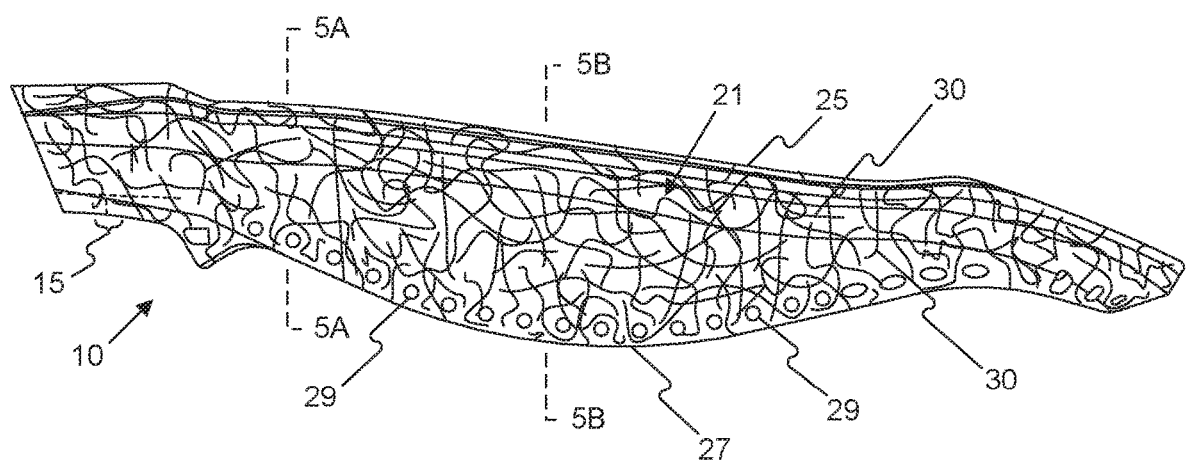
FIG. 4 is a side view of a lacrosse head.

A throat 17 may be located on an opposite end of the hub 11. Sidewalls 19 and 21 may extend from the hub 11 until they merge with a scoop 23. The sidewalls 19 and 21 may include a top edge 25 and a bottom edge 27, as depicted in FIG. 4, which depicts a side view of an exemplary lacrosse head. Just above the bottom edge 27, a multiplicity of holes 29 may be provided as illustrated by FIG. 4. The holes may be used for coupling a string mesh or net-like mesh to the lacrosse head 10. Similar holes may be located on the bottom edge of the side wall 19. The slots 31 located on the scoop 23 may facilitate connecting the mesh webbing at those locations.

Moreover, the slots 31 may be used advantageously to alter the center of gravity of the lacrosse head 10. This may be accomplished by inserting sacrificial material, such as weights, in discrete areas or by removing additional material. In alternate embodiments, the mesh netting may have connections of varying weight and distribution at end points that can seamlessly couple to the multiplicity of slots 31 thereby altering the center of gravity with a single attachment.

In an alternate embodiment, the sidewalls 19 and 21 are solid and do not have openings or other reinforcement. In other embodiments, the sidewalls have openings for receiving a coating or a strip. The coating/strip may have varying weight and varying thicknesses that advantageously affect the center of gravity. The lacrosse head sidewalls 19 and 21 may be molded or machined with positive or negative recesses, apertures, or openings.

In at least one embodiment, the wall thicknesses may be on the order of approximately 0.020 inches. In other embodiments, the wall thickness may be on the order of approximately 0.20 inches. In other embodiments still, the wall thickness may fall within the range of approximately 0.020 inches and approximately 0.20 inches. The thickness of the sidewalls 19 and 21 may be controlled to reduce the weight of the lacrosse head 10. Moreover, some sections of a lacrosse head 10 may have a thicker sidewall than other areas. For example, the interior net side may have thinner sidewall edges to facilitate a scooping action while outer portions of the lacrosse head sidewalls 19 and 21 may have a greater thickness to protect against impact.

Reductions in sidewall thickness may be advantageous because the mesh area may be wider and therefore have a greater area to receive an object, such as a lacrosse ball. Further, the thinner sidewall construction provides a greater aerodynamic efficiency and may allow a lacrosse player to swing a lacrosse head as disclosed with greater velocity.

Figures 5A, 5B:
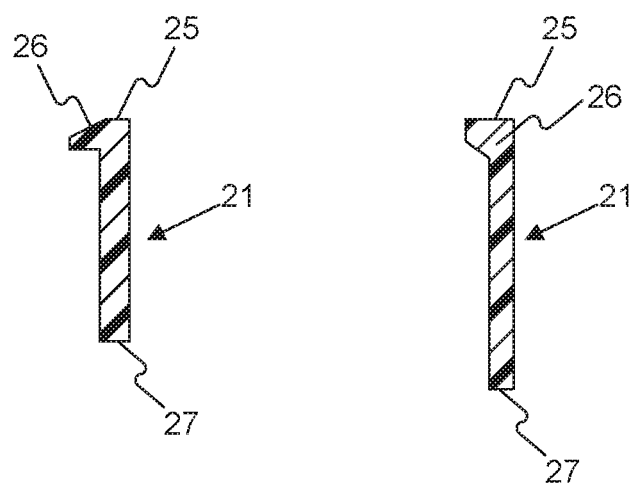
FIGS. 5A-5B are cross-sectional views of the lacrosse head of FIG. 4.

FIGS. 5A-5B depict cross sectional views of the lacrosse head of FIG. 4. FIG. 5A is a cross-sectional view along line 5A and FIG. 5B is a cross-sectional view along line 5B. The cross-section of sidewall 21 may be substantially similar to the cross-section of sidewall 19.

The top edge 25 of an exemplary lacrosse head may transition into a widened top wall 26. The widened top wall 26 may intersect with the top edge 25 to form a top portion of the lacrosse head 10. The top portion may form from the throat 17 to the scoop 23 (see FIG. 3 and FIG. 4). As illustrated, the bottom edge 27 may be significantly narrower. However, in other embodiments the top edge may be narrower as may be consistent with the customized approach to sidewall thicknesses disclosed throughout this application.

Moreover, the sidewalls of the lacrosse head 10 do not require reinforcing ribs to be incorporated into the sidewall structure, as was necessary with prior lacrosse heads made from, for example, plastic or carbon fiber, because the sidewall structure is formed of a high strength material. However, in alternate embodiments the sidewall structure may additionally include other fibers, such as parallel strand fibers and/or weave fibers, for example, oriented along the side walls. The reinforcing parallel strand fibers may reinforce the sidewalls at the discrete locations in which they are installed.

In some embodiments, parallel strand fibers may circumscribe the edges of the lacrosse head 10 and in other embodiments the parallel stand fibers may be employed along the sidewalls sparingly. As shown, there is no need for strengthening or reinforcing ribs in the sidewall structure because the random dispersion of fibers has significantly increased the mechanical properties of the lacrosse head.

The presence of parallel strand fibers, weave fibers, and randomly oriented fibers is advantageous, because the parallel strand fibers and weave fibers increase the structural rigidity. The randomization of fibers, however, reduces the shear stress.

Moreover, the combination is particularly advantageous because the randomly oriented fibers and weave fibers may maintain localized fractures and do not facilitate crack propagation as would be the case if only parallel strand fibers were used. Therefore, damage due to impact is reduced by the layering of random, parallel, and various weave patterns of fibers.

Figure 6A:
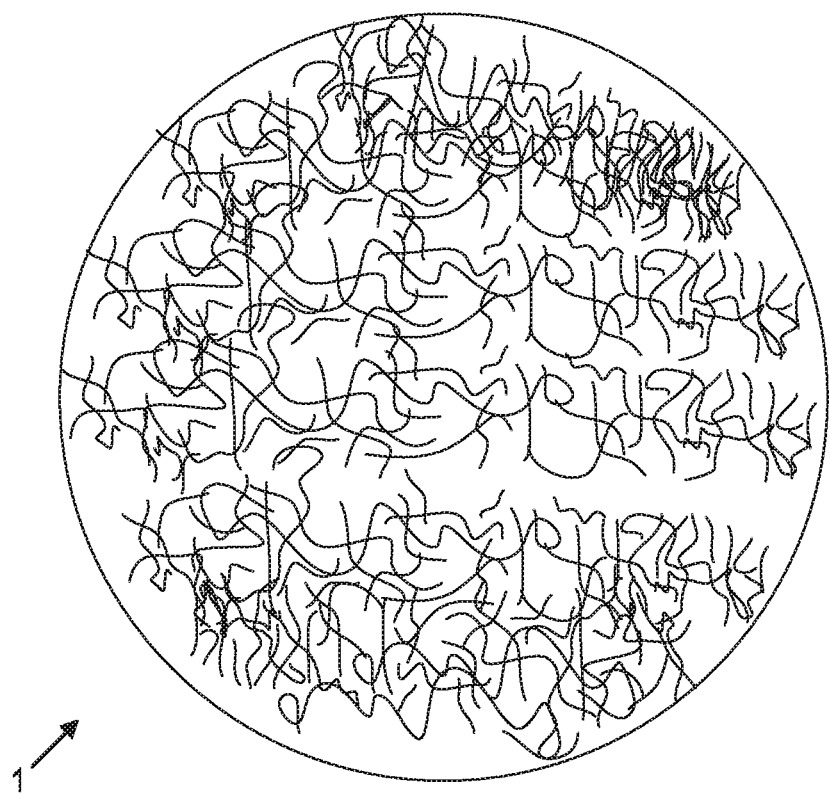
FIG. 6A is a representation of a randomly distributed fiber matrix material of a lacrosse product.

FIG. 6 is a representation of a randomly distributed fiber matrix material of a lacrosse head. FIG. 6 may illustrate the random distribution of bundles of fibers. The consistent and random distribution of fibers throughout the matrix is similar to and behaves like an isotropic material. The matrix material may be considered a quasi isotropic material with a substantially homogeneous mesostructure.

Figure 6B:
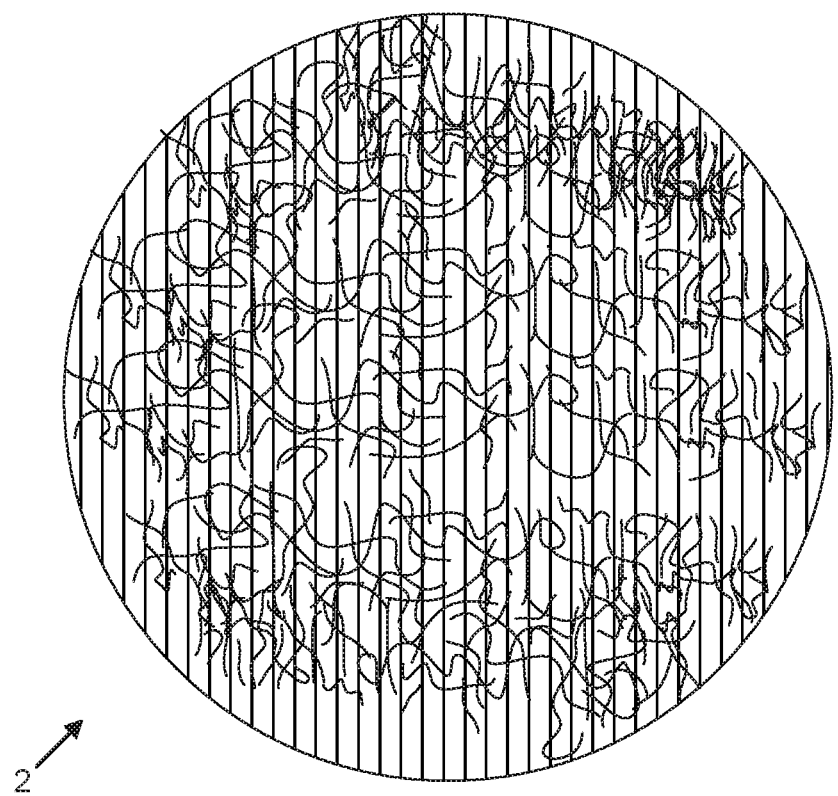
FIG. 6B is a representation of parallel oriented fibers within a randomly distributed fiber matrix material of a lacrosse product.

FIG. 6B is a representation of a randomly distributed fiber matrix material with parallel strand fibers. FIG. 6B may illustrate shorter randomly distributed bundles of fibers alongside longer parallel strand bundles of fibers. The parallel strand fibers may increase the structural rigidity in the discrete locations they are utilized.

Figure 7:
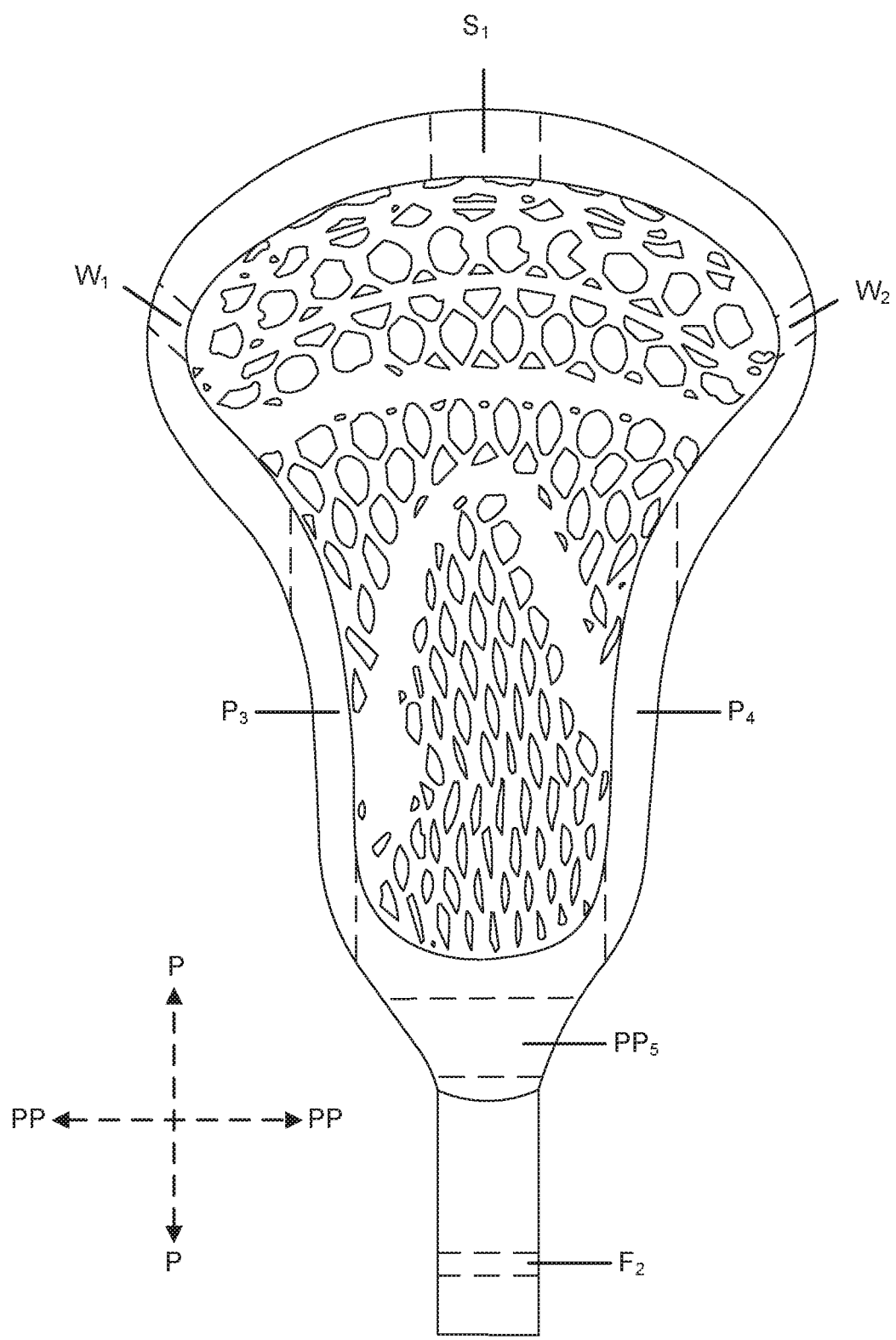
FIG. 7 is a representation of a lacrosse head with modifications.

FIG. 7 is a representation of an interplay between sacrificial materials, parallel strand fibers, weave fibers, and randomly distributed fibers of a lacrosse head. FIG. 7 has first and second reference axes. The first reference axis, P-P is substantially parallel with the major axis of what would correspond to a lacrosse stick (not illustrated). The second reference axis, PP-PP is substantially perpendicular to the major axis of what would correspond to a lacrosse stick (not illustrated).

In the exemplary embodiment, a sacrificial material, such as a lead weight, may be installed within region $S_1$. Parallel strand fibers may be installed within regions $P_3$, $P_4$, and $PP_5$. Regions $P_3$ and $P_4$ may represent regions in which the major axis of the parallel strand fibers is parallel to axis P-P. Similarly, region $PP_5$ may represent a region in which parallel strand fibers are parallel to axis PP-PP. Weave fibers or a fiberlike mesh may be installed within regions $W_1$ and $W_2$.

In the exemplary embodiment, the sacrificial material may be placed opposite the hub of the lacrosse head. However, in other embodiments sacrificial material may be placed around the outer edges of a lacrosse head. The sacrificial material placement may move the center of gravity of the lacrosse head to promote balance and performance. For example, the lacrosse head may have a greater cross sectional thickness and weight towards the hub and a sacrificial material (such as a lead weight) may be inserted in the region bound by $S_1$ to offset the weight distribution.

In alternate embodiments, sacrificial material may be strategically placed along the sidewalls, throat, and scoop, to alter the center of gravity. Therefore, when lacrosse heads of varying sidewall thicknesses and geometrical orientations are molded the usage of sacrificial weights may re-orient the center of gravity in a preferred location, such as the relative center of the lacrosse head netting.

In the exemplary embodiment, parallel fibers may increase the structural rigidity in the zones that they are located. In addition, the specific orientation of the parallel fibers along an axis may substantially increase the structural rigidity in the direction of the major axis of the fibers while insubstantially affecting the structural rigidity in the opposite direction. For example, regions $P_3$, $P_4$, and $PP_5$ may increase the structural rigidity along the respective axis the fibers are oriented.

In the exemplary embodiment, weave fibers may increase the structural rigidity in the zones that they are located. In at least one embodiment, the weave fibers may uniformly increase the structural rigidity in the zone they are installed. For example, $W_1$ and $W_2$ may uniformly stiffen the upper edges of the lacrosse head where impacts are likely to occur. Weave fibers may be particularly advantageous in this region, as the arcing of the region does not lend itself well to parallel strand fiber installation.

Figure 8A:
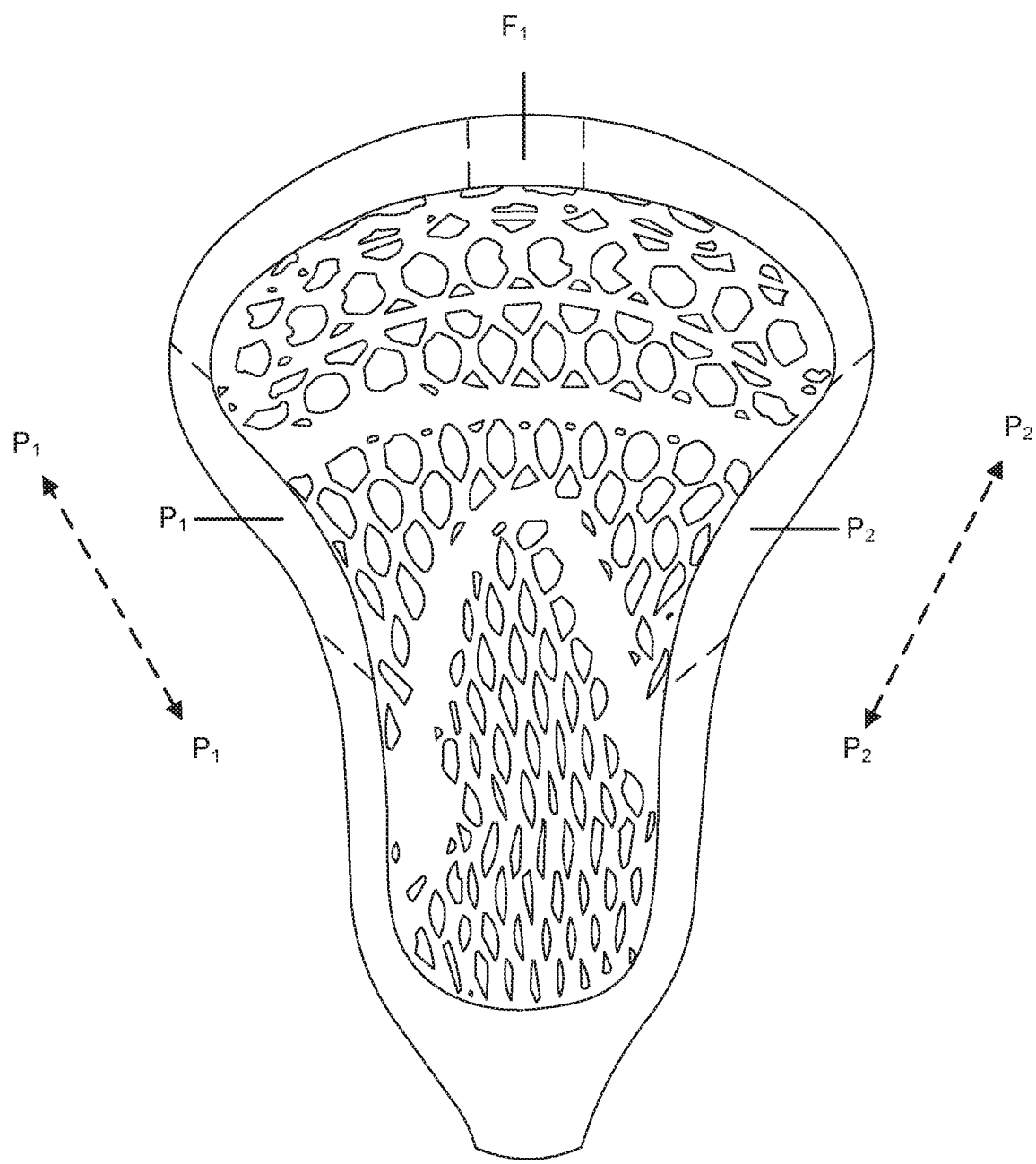
FIG. 8A is a representation of a lacrosse head with modifications.

FIG. 8A is a representation of an alternate interplay between parallel strand fibers, flexural zones, and randomly distributed fibers of a lacrosse head. $F_1$ may represent a flexural region consisting of a hollow void space that may be removed by an industrial process, such as, precision drilling. A removal of material at discretely controlled locations of precisely controlled depths, angles, and amounts, may modify the structural properties of a lacrosse head to form flexural zones and/or points. The removal of material may also advantageously alter the center of gravity of a lacrosse head.

In those areas where additional flex is desirable, removal of material in specifically controlled amounts and diameters may advantageously alter the flexural strength of a discrete zone of a lacrosse head. The hollow void space may then be filled, at least partially, to promote resiliency and further affect the flexural properties of the lacrosse head. Similarly, the hollow void space around the netting or slotting may be filled with an alternate matrix.

In at least one embodiment, the hollow void space may be filled with an alternate matrix, such as a rubberized epoxy, with excellent flexural properties. In other embodiments, the material is self-expanding and or injected under pressure to form a strong bond along the interior walls of the void space of the removed material.

The regions $P_1$ and $P_2$ represent areas where parallel strand fibers are installed. The parallel strand fibers of region $P_1$ are oriented along axis $P_1$-$P_1$. Similarly, the parallel strand fibers of region $P_2$ may be oriented along axis $P_2$-$P_2$.

Figure 8B:
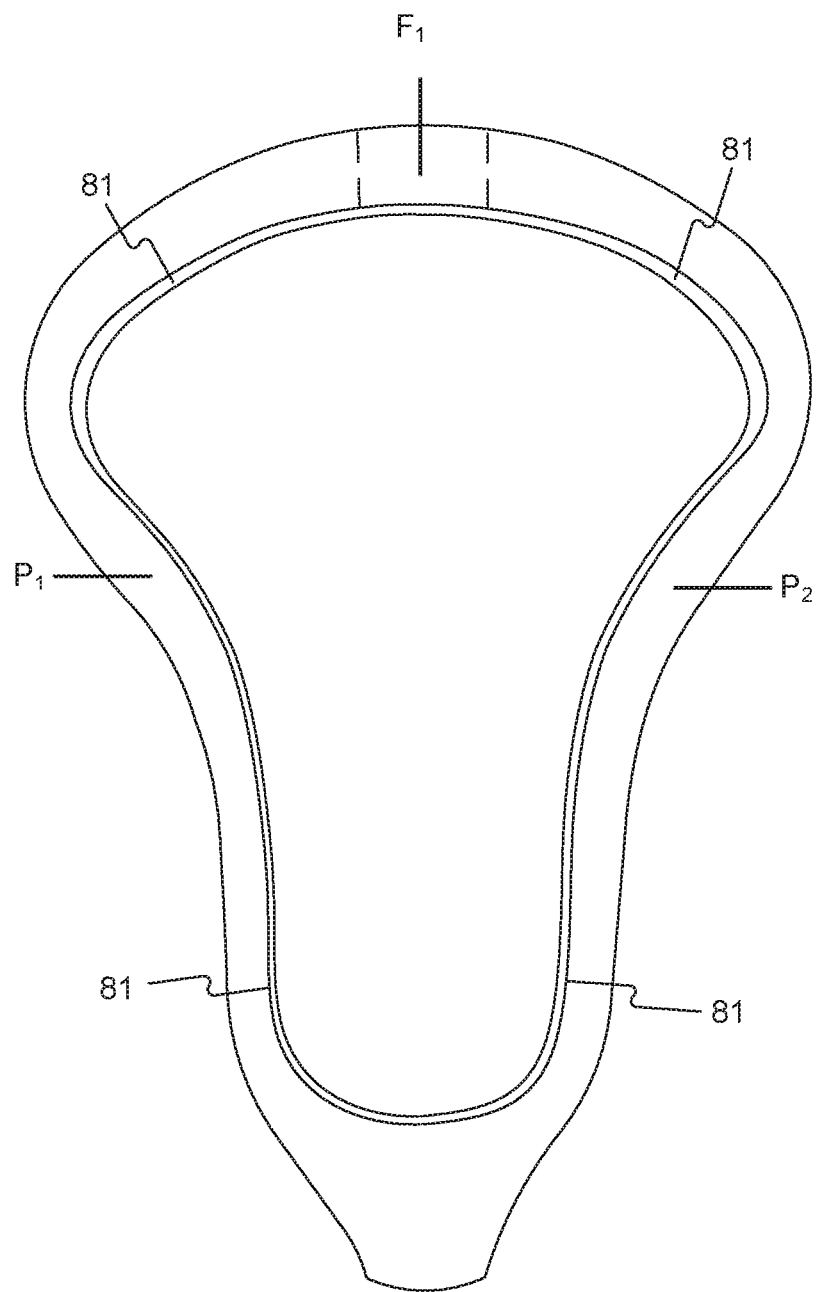
FIG. 8B is another representation of a lacrosse head with modifications.

FIG. 8B is a representation of an alternate lacrosse head that is substantially similar to the lacrosse head of FIG. 8A. In the exemplary embodiment, an inset rail 81 may circumscribe the interior of the lacrosse head. The inset rail 81 may be a recessed area sized to receive a one piece netting. In other embodiments, the inset rail 81 may be a slotted inset rail 81 to receive a multi-piece netting. In other embodiments still, inset rail 81 is a coupling location for any type of netting that is seamlessly molded with the lacrosse head during a manufacturing process.

Exemplary netting may be a nylon, polyester, polyethylene, polypropylene, UHMWPE, aramid, carbon or a blend of the same. Netting may be chosen for its particular resiliency and formability during the manufacturing process.

Figure 8C:
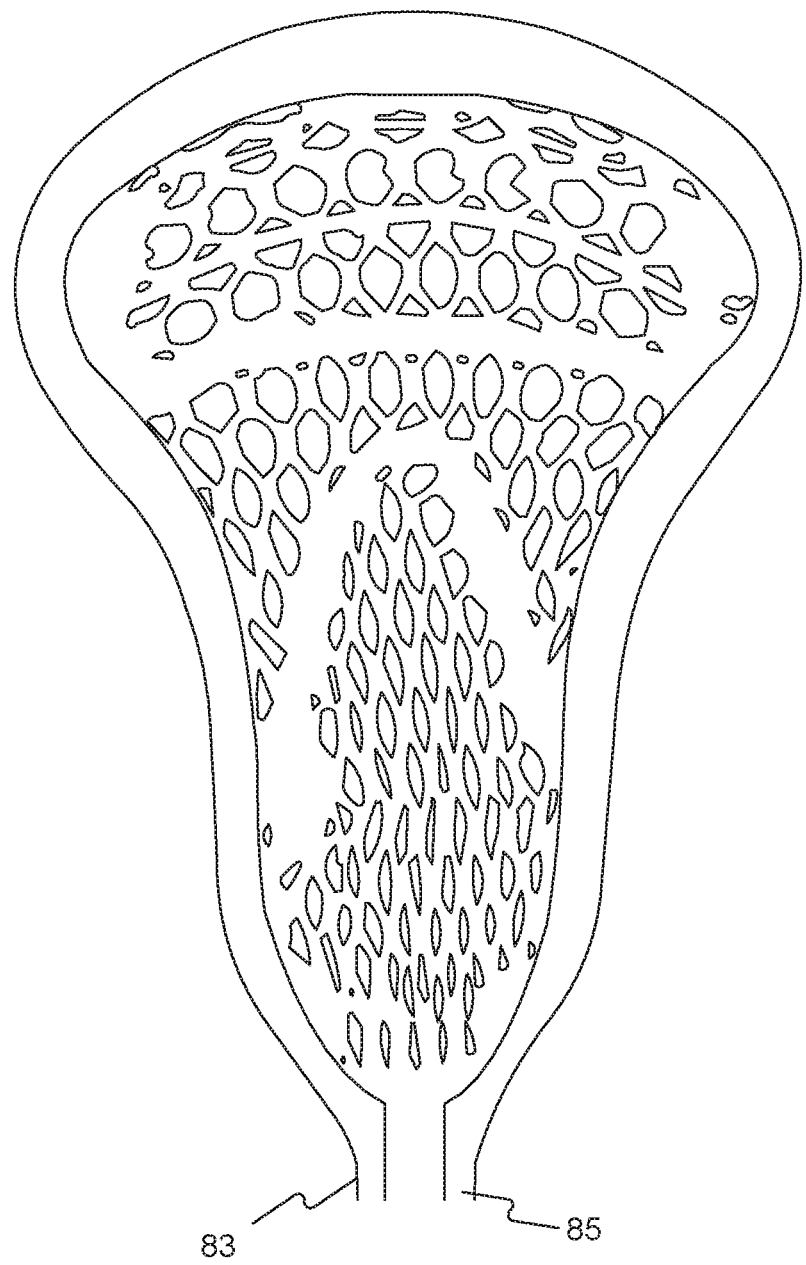
FIG. 8C is another representation of a lacrosse head with modifications.

FIG. 8C is a representation of an alternate lacrosse head. In the exemplary embodiment, the hub 11 and socket 13 of FIG. 3 are modified. In the exemplary embodiment, the bottom of the lacrosse head may have a first arm 83 and a second arm 85. The arms 83, 85 may have a curved interior edge such that a lacrosse stick with a corresponding circular cross section may be inserted in between arms 83, 85 and remain fully in contact with arms 83, 85. In the exemplary embodiment, arms 83, 85 may allow a significant range of lacrosse sticks of varying cross sectional diameter and shape to be attached (not illustrated). A further advantage is that the bottom of the lacrosse head may be discontinuous, and therefore, a natural flex location may be created by way of the discontinuity and arms 83, 85.

Figures 9A, 9B:
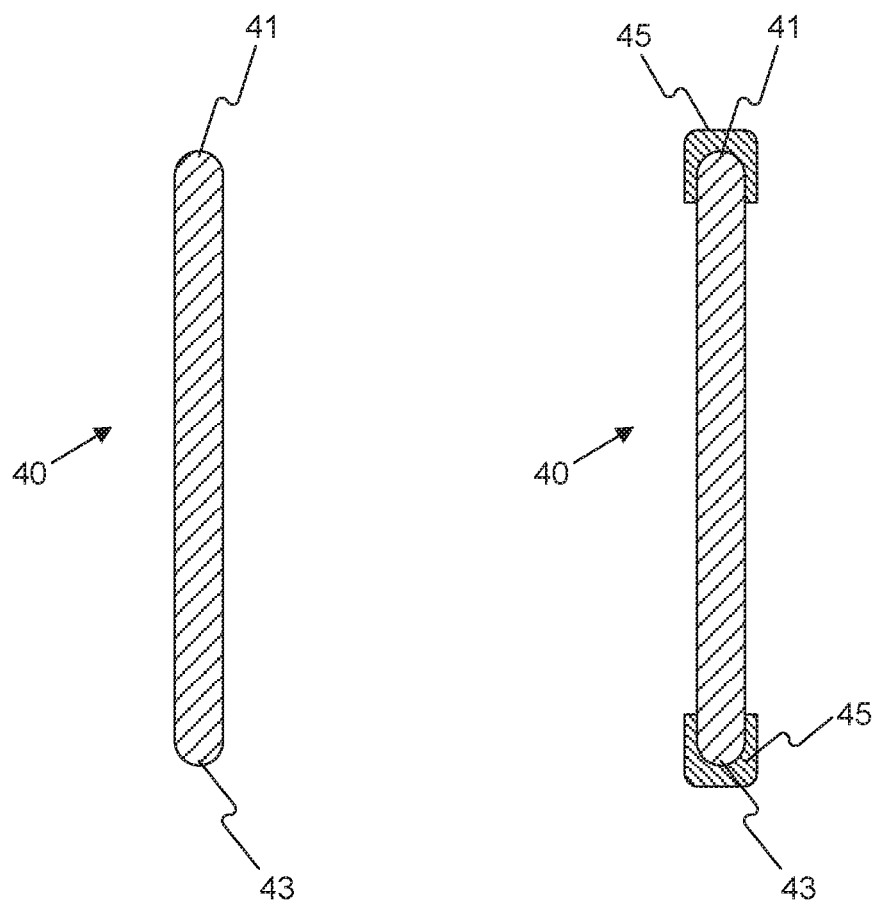
FIGS. 9A-9B are sidewall illustrations of a lacrosse head.

FIGS. 9A and 9B provide cross-sectional views of an alternate sidewall of a lacrosse head. FIG. 9 shows a cross-section of a wall 40 having a chamfered first end 41 and a chamfered second end 43. The chamfered ends may beneficially distribute impacts and lessen wind resistance. FIG. 9B may illustrate the sidewall of FIG. 9A with a resilient coating 45. In at least one exemplary embodiment, the ends are optionally provided with a coating 45 to cushion impacts. The coating 45 may include rubber, synthetic rubber, soft plastic, foamed rubber, foamed plastic, and/or other resilient coating materials.

Figure 10:
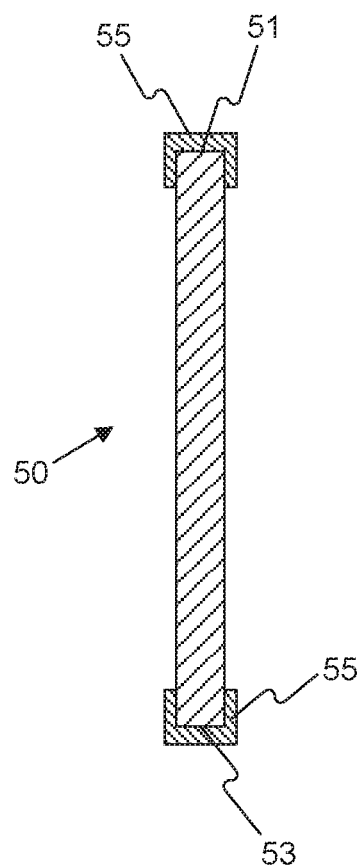
FIG. 10 is an alternative sidewall illustration of a lacrosse head.
Figure 11:
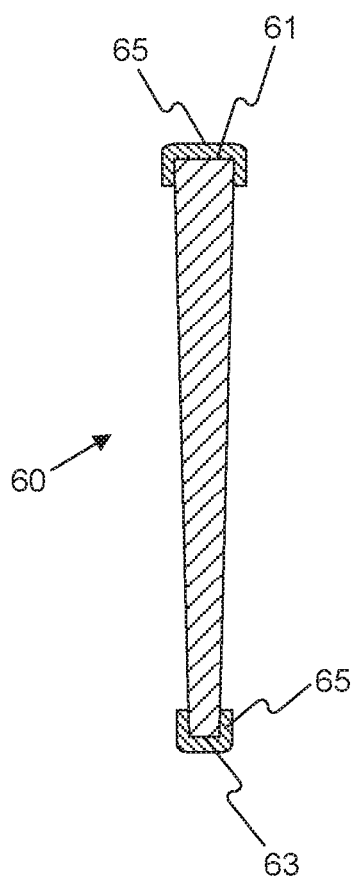
FIG. 11 is an alternative sidewall illustration of a lacrosse head.
Figure 12A:
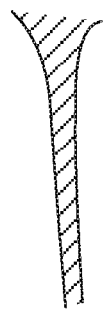
FIGS. 12A-12F are alternative sidewall illustrations of a lacrosse head.
Figure 12B:
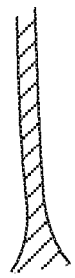
Figure 12C:
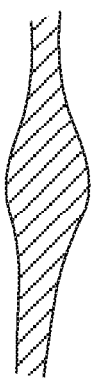
Figure 12D:
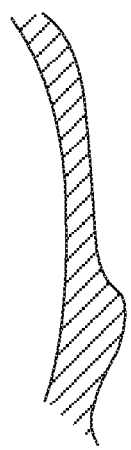
Figure 12E:
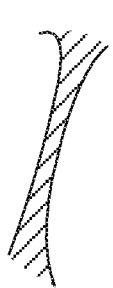
Figure 12F:

FIG. 10 shows a cross-section of a wall 50 having a flat first end 51 and a flat second end 53. A resilient coating 55 is selectively applied to ends 51 and 53. FIG. 11 shows a cross-section of a wall 60 that is wedge-shaped and has a larger width first end 61 and a smaller width second end 63. The smaller width second end 63 and wedge-shaped cross-section may provide reduced wind resistance across the sidewall. This may facilitate faster swinging motion of an associated lacrosse head and increased performance. As illustrated, a resilient coating 65 is selectively applied to ends 61 and 63. However, it should be understood that a resilient coating, such as 65 is optional.

FIGS. 12A-12F illustrate a series of alternate sidewall cross sections. The exemplary sidewalls may have similar features and properties as FIGS. 9A-11. Moreover, the aforementioned cross sections are exemplary and other combinations of coatings and orientations may be provided. In those embodiments in which a coating is employed, the coating may include solar absorptive material with photoluminescent properties. For example, the coating may glow in low lighting conditions.

While illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit being indicated by the following claims and their full scope of equivalents.

What is claimed is:

1. A lacrosse head comprising:
    a scoop;
    a throat;
    a pair of unbroken opposed sidewalls arranged to interconnect the scoop to the throat, each sidewall having an average thickness of about 0.020 inches to 0.20 inches, the pair of unbroken opposed sidewalls being continuous, and having an interior edge and an exterior edge;
    a hub connected to the throat, the hub including a socket configured to receive a stick;
    a multiplicity of slots disposed along the interior edge of each of the sidewalls, wherein the multiplicity of slots are dimensioned to:
    connect a mesh netting to the lacrosse head;
    orient a center of gravity of the lacrosse head relative to a central portion of the mesh netting; and at least one sacrificial weight selectively embedded within at least one of the scoop, throat, and pair of sidewalls, the sacrificial weight being integrally embedded with a matrix material such that the sacrificial weight orients a center of gravity of the lacrosse head relative to the central portion of the mesh netting;
    wherein at least one of the scoop, throat, pair of opposed sidewalls, and hub comprise the matrix material embedded with a plurality of substantially randomly dispersed reinforcing fibers.

2. A lacrosse head comprising:
    a scoop;
    a throat;
    a pair of unbroken opposed sidewalls arranged to interconnect the scoop to the throat, each sidewall having an average thickness of about 0.020 inches to 0.20 inches, the pair of unbroken opposed sidewalls being continuous, and having an interior edge and an exterior edge;
    a hub connected to the throat, the hub including a socket configured to receive a stick;
    an inset rail circumscribing the interior edge of each sidewall, the inset rail being dimensioned to connect a multi-piece netting; and
    at least one sacrificial weight selectively integrally embedded within at least one of the scoop, throat, and pair of sidewalls, the sacrificial weight being arranged such that the sacrificial weight orients a center of gravity of the lacrosse head relative to the central portion of the multi-piece netting;
    wherein at least one of the scoop, throat, pair of opposed sidewalls, and hub comprise a matrix material embedded with a plurality of substantially randomly dispersed reinforcing fibers.

3. A lacrosse head formed of a matrix material embedded with a plurality of substantially randomly dispersed reinforcing fibers comprising:
    a scoop;
    a throat;
    a pair of unbroken and opposed sidewalls arranged to interconnect the scoop to the throat, each sidewall being continuous and having an average thickness of about 0.020 inches to 0.040 inches, and having an interior edge and an exterior edge, the exterior edge being coated with a resilient material; and
    a hub connected to the throat, the hub including a socket configured to receive a stick,
    wherein at least one sacrificial weight is integrally embedded within at least one of the scoop, throat, and pair of sidewalls, the sacrificial weight being integrally embedded within the matrix material and being arranged such that the sacrificial weight orients a center of gravity of the lacrosse head relative to the central portion of the multi-piece netting.

4. The lacrosse head of claim 3, wherein each sidewall has an average thickness of about 0.030 inches to 0.15 inches.

5. The lacrosse head of claim 4, wherein the interior edge of each sidewall has a first thickness, the exterior edge of each sidewall has a second thickness, and the first thickness is less than the second thickness.

6. The lacrosse head of claim 3, wherein a plurality of parallel strand fibers are embedded within the sidewalls.

7. The lacrosse head of claim 3, wherein a plurality of parallel strand fibers having a major axis are embedded within the sidewalls and the plurality of parallel strand fibers are arranged to selectively increase a structural rigidity of the lacrosse head in a direction of the major axis and insubstantially affect the structural rigidity of the lacrosse head in a direction opposite the major axis.

8. The lacrosse head of claim 6, wherein the plurality of parallel strand fibers have a major axis that is oriented parallel to an imaginary projection axis corresponding to a major axis of the stick.

9. The lacrosse head of claim 6, wherein at least a portion of the plurality of parallel strand fibers have a major axis that is oriented perpendicular to an imaginary projection axis corresponding to a major axis of the stick.

10. The lacrosse head of claim 3, further including at least one group of weave fibers embedded within the scoop.

11. A lacrosse head comprising:

a scoop;

a threat;

a pair of unbroken opposed sidewalls arranged to interconnect the scoop to the throat, each sidewall having an average thickness of about 0.020 inches to 0.20 inches, the pair of unbroken opposed sidewalls being continuous, and having an interior edge and an exterior edge;

and a pair of arms dimensioned to receive a stick such that the pair of arms facilitates flexural bending in a region corresponding to a junction between the pair of arms and the lacrosse stick;

at least one sacrificial weight selectively embedded within at least one of the scoop, throat, and pair of sidewalls, the sacrificial weight being integrally embedded with a matrix material such that the sacrificial weight orients a center of gravity of the lacrosse head relative to the central portion of a mesh netting;

wherein at least one of the scoop, throat, pair of opposed sidewalls, and a pair of arms comprise a matrix material embedded with a plurality of substantially randomly dispersed reinforcing fibers.

12. The lacrosse head of claim 3, further including a plurality of bores within at least one of the scoop, throat, and pair of sidewalls, wherein the plurality of bores are filled with an elastomeric material.

13. The lacrosse head of claim 3, wherein each sidewall has an average thickness of about 0.020 inches.

* * * * *